(12) United States Patent
Neitzell et al.

(10) Patent No.: US 9,909,870 B2
(45) Date of Patent: Mar. 6, 2018

(54) LEVEL INCLUDING REMOVABLE END CAPS

(71) Applicant: Milwaukee Electric Tool Corporation, Brookfield, WI (US)

(72) Inventors: Roger D. Neitzell, Palmyra, WI (US); Christopher F. Boehme, Pewaukee, WI (US); John Christianson, Waukesha, WI (US); Fraizier Reiland, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 160 days.

(21) Appl. No.: 14/941,022

(22) Filed: Nov. 13, 2015

(65) Prior Publication Data

US 2016/0138918 A1    May 19, 2016

Related U.S. Application Data (60) Provisional application No. 62/079,054, filed on Nov. 13, 2014, provisional application No. 62/159,025, filed on May 8, 2015, provisional application No. 62/180,287, filed on Jun. 16, 2015, provisional application No. 62/180,461, filed on Jun. 16, 2015.

(51) Int. Cl.
*G01C 9/34* (2006.01)
*G01C 25/00* (2006.01)

(52) U.S. Cl.
CPC .............. *G01C 9/34* (2013.01); *G01C 25/00* (2013.01)

(58) Field of Classification Search
CPC ....................................... G01B 9/34

USPC .................................. 33/376, 379, 381, 382
See application file for complete search history.

(56) References Cited

U.S. PATENT DOCUMENTS

| | | | |
|---|---|---|---|
| 232,982 A | 10/1880 | Langdon | |
| 675,464 A | 6/1901 | Carlson | |
| 730,790 A | 6/1903 | Newman | |
| 1,033,742 A * | 7/1912 | Skates | G01C 9/28 33/379 |
| 2,171,971 A | 9/1939 | Cravaritis et al. | |
| 2,535,791 A | 12/1950 | Fluke | |
| 2,634,509 A | 4/1953 | Roberts | |
| 2,695,949 A | 11/1954 | Ashwill | |
| 2,789,363 A | 4/1957 | Miley | |
| 2,939,947 A | 10/1958 | Schultz | |

(Continued)

FOREIGN PATENT DOCUMENTS

| | | |
|---|---|---|
| CN | 101487701 | 8/2011 |
| EP | 0126844 | 12/1984 |

(Continued)

OTHER PUBLICATIONS

International Search Report and Written Opinion for Application No. PCT/US2015/060652 dated Jan. 28, 2016 (13 pages).

*Primary Examiner* — G. Bradley Bennett
(74) *Attorney, Agent, or Firm* — Reinhart Boerner Van Deuren s.c.

(57) ABSTRACT

A level includes a frame supporting a plurality of vials and having an aperture disposed on an end of the level. The level also includes an end cap assembly detachably coupled to the end of the frame. The end cap assembly includes an end cap and a retainer. A portion of the end cap is received in the aperture and is maintained in engagement with the frame by the retainer.

16 Claims, 10 Drawing Sheets

(56) References Cited

U.S. PATENT DOCUMENTS

| | | |
|---|---|---|
| 3,036,791 A | 2/1960 | Siggelkow |
| 3,046,672 A | 7/1962 | Lace |
| 3,100,937 A | 8/1963 | Burch |
| 3,110,115 A | 11/1963 | Hubbard |
| 3,116,563 A | 1/1964 | Gelbman |
| 3,180,036 A | 4/1965 | Meeks |
| 3,187,437 A | 6/1965 | Hampton |
| 3,213,545 A | 10/1965 | Wright |
| 3,279,080 A | 10/1966 | Stepshinski |
| 3,832,782 A | 9/1974 | Johnson et al. |
| 1,881,259 A | 5/1975 | Pigeon |
| 4,099,331 A | 7/1978 | Peterson et al. |
| 4,126,944 A | 11/1978 | Burkhart |
| 4,338,725 A | 7/1982 | Martin et al. |
| 4,407,075 A | 10/1983 | MacDermott et al. |
| 4,463,501 A | 8/1984 | Wright et al. |
| 4,546,774 A | 10/1985 | Haught |
| 4,589,213 A | 5/1986 | Woodward |
| 4,591,475 A | 6/1986 | Mayes |
| 4,793,069 A | 12/1988 | McDowell |
| 4,888,880 A | 12/1989 | Parker |
| 5,077,911 A | 1/1992 | von Wedemeyer |
| 5,080,317 A | 1/1992 | Letizia |
| 5,119,936 A | 1/1992 | Letizia |
| 5,165,650 A | 6/1992 | Sevey |
| 5,199,177 A | 4/1993 | Hutchins et al. |
| 5,388,338 A | 2/1995 | Majors |
| 5,412,876 A | 5/1995 | Scheyer |
| 5,479,717 A | 1/1996 | von Wedemeyer |
| 5,505,001 A | 4/1996 | Schaver, Jr. |
| 5,535,523 A | 7/1996 | Endris |
| 5,659,967 A | 8/1997 | Dufour |
| 5,709,034 A | 1/1998 | Kohner |
| 5,749,152 A | 5/1998 | Goss et al. |
| 5,755,037 A | 5/1998 | Stevens |
| 5,784,792 A | 7/1998 | Smith |
| 5,813,130 A | 9/1998 | MacDowell |
| 6,003,234 A | 12/1999 | Seibert |
| 6,029,360 A | 2/2000 | Koch |
| 6,070,336 A | 6/2000 | Rodgers |
| 6,173,502 B1 | 1/2001 | Scarborough |
| 6,381,859 B1 | 5/2002 | Wedemeyer |
| 6,568,095 B2 | 5/2003 | Snyder |
| 6,675,490 B1 | 1/2004 | Krehel et al. |
| 6,732,441 B2 | 5/2004 | Charay et al. |
| 6,760,975 B1 * | 7/2004 | Schmidt ............... G01C 9/28 33/379 |
| 6,782,628 B2 | 8/2004 | Liao |
| 6,785,977 B1 | 9/2004 | Crichton |
| 6,792,686 B2 | 9/2004 | Krehel et al. |
| 6,792,868 B2 | 9/2004 | Teilhol et al. |
| 6,818,824 B1 | 11/2004 | Marcou et al. |
| 6,839,973 B1 | 1/2005 | Woodward |
| 6,915,585 B2 | 7/2005 | Von Wedemeyer |
| 6,935,035 B2 | 8/2005 | Smith |
| 6,988,320 B2 | 1/2006 | Kallabis et al. |
| 7,028,413 B2 | 4/2006 | Filipescu |
| 7,073,270 B2 | 7/2006 | Kim |
| 7,089,676 B2 | 8/2006 | Godinez |
| 7,150,106 B2 | 12/2006 | Kallabis et al. |
| 7,152,335 B2 | 12/2006 | Nichols |
| 7,204,029 B2 | 4/2007 | Tran et al. |
| 7,228,637 B2 | 6/2007 | Kim |
| 7,278,218 B2 | 10/2007 | Levine |
| 7,316,074 B2 | 1/2008 | Tran et al. |
| 7,343,692 B2 | 3/2008 | Gould |
| 7,360,316 B2 | 4/2008 | Hoover et al. |
| 7,363,719 B2 | 4/2008 | Levinson et al. |
| 7,392,594 B2 | 7/2008 | Kesler |
| 7,398,600 B2 | 7/2008 | Ming |
| 7,406,773 B2 | 8/2008 | Helda |
| 7,409,772 B1 | 8/2008 | Morrissey |
| 7,467,475 B1 | 12/2008 | Cheek |
| 7,472,486 B2 | 1/2009 | Tran et al. |
| 7,472,487 B2 | 1/2009 | Tran et al. |
| 7,484,307 B2 | 2/2009 | Abrecht |
| 7,513,055 B2 | 4/2009 | Montgomery |
| 7,513,056 B1 | 4/2009 | Hobden et al. |
| 7,520,065 B2 | 4/2009 | Vernola |
| 7,536,798 B2 | 5/2009 | Silberberg |
| 7,552,540 B2 | 6/2009 | Ming |
| 7,565,749 B2 | 7/2009 | Helda |
| 7,568,292 B2 | 8/2009 | Maruyama |
| 7,607,235 B1 | 10/2009 | Morrissey |
| 7,644,506 B2 | 1/2010 | Wong |
| 7,675,612 B2 | 3/2010 | Kallabis |
| 7,685,723 B2 | 3/2010 | Kallabis |
| 7,748,128 B2 | 4/2010 | Martin |
| 7,735,229 B2 | 6/2010 | Allemand |
| 7,765,706 B2 * | 8/2010 | Scheyer ............... G01C 9/28 33/379 |
| 7,770,298 B1 | 8/2010 | Wojciechowski et al. |
| 7,802,371 B2 | 9/2010 | Ming |
| 7,827,699 B2 | 11/2010 | Montgomery |
| 7,832,112 B2 * | 11/2010 | Christianson ........... G01C 9/28 33/365 |
| 7,866,055 B2 | 1/2011 | Zhang et al. |
| 7,946,045 B2 | 5/2011 | Allemand |
| 8,011,108 B2 | 9/2011 | Upthegrove |
| 8,061,051 B2 | 11/2011 | Allemand |
| 8,109,005 B2 | 2/2012 | Hudson et al. |
| 8,291,605 B2 * | 10/2012 | Christianson ........... G01C 9/28 33/379 |
| 8,336,221 B2 | 12/2012 | Steele et al. |
| 8,413,342 B2 | 4/2013 | Christianson |
| 8,443,812 B2 | 5/2013 | Regalado et al. |
| 8,631,584 B2 | 1/2014 | Steele et al. |
| 8,826,554 B2 | 9/2014 | Bariteau |
| 8,850,710 B1 | 10/2014 | Rodrigue et al. |
| 8,910,390 B2 | 12/2014 | Steele et al. |
| 8,925,212 B2 | 1/2015 | Allemand |
| 9,021,710 B2 | 5/2015 | Siberberg |
| 2001/0013176 A1 * | 8/2001 | Ruther ............... B25H 7/00 33/451 |
| 2003/0005590 A1 | 1/2003 | Snyder |
| 2005/0155241 A1 | 7/2005 | Scheyer |
| 2005/0223577 A1 * | 10/2005 | Scarborough ........... G01C 9/28 33/379 |
| 2006/0053563 A1 | 3/2006 | Skinner |
| 2006/0196061 A1 | 9/2006 | Nichols |
| 2006/0283031 A1 | 12/2006 | Ming |
| 2007/0028472 A1 | 2/2007 | Brown |
| 2007/0113413 A1 | 5/2007 | Feliciano |
| 2007/0113414 A1 | 5/2007 | Levinson et al. |
| 2007/0175056 A1 | 8/2007 | Tran et al. |
| 2007/0234581 A1 | 10/2007 | Ming |
| 2008/0022543 A1 | 1/2008 | Kesler |
| 2008/0222907 A1 | 9/2008 | Silberberg |
| 2008/0271331 A1 | 11/2008 | Allemand |
| 2008/0282562 A1 | 11/2008 | Allemand |
| 2008/0301957 A1 | 12/2008 | Vernola |
| 2009/0013545 A1 | 1/2009 | Cheek |
| 2009/0158605 A1 | 6/2009 | Montgomery |
| 2010/0000105 A1 * | 1/2010 | Zhang ............... G01C 9/28 33/365 |
| 2010/0000106 A1 * | 1/2010 | Zhang ............... G01C 9/26 33/365 |
| 2010/0005671 A1 | 1/2010 | Hudson et al. |
| 2010/0095541 A1 | 4/2010 | Inthavong |
| 2010/0205814 A1 | 8/2010 | Allemand |
| 2011/0099823 A1 | 5/2011 | Christianson et al. |
| 2011/0099824 A1 | 5/2011 | Christianson et al. |
| 2011/0119941 A1 | 5/2011 | Steele et al. |
| 2011/0265338 A1 | 11/2011 | Christianson et al. |
| 2013/0091717 A1 * | 4/2013 | Steele ............... G01C 9/18 33/382 |
| 2013/0167387 A1 | 7/2013 | Lueck et al. |
| 2013/0305548 A1 | 11/2013 | Lueck et al. |
| 2014/0007438 A1 | 1/2014 | Silberberg |
| 2014/0007439 A1 | 1/2014 | Silberberg |
| 2014/0373371 A1 | 12/2014 | Silberberg |

(56) References Cited

U.S. PATENT DOCUMENTS

2016/0138916 A1* 5/2016 Neitzell .................. G01C 9/36
                                                          33/381
2016/0138917 A1* 5/2016 Schwoegler ............ G01C 9/28
                                                          33/381
2016/0138918 A1* 5/2016 Neitzell ................. G01C 25/00
                                                          33/381

FOREIGN PATENT DOCUMENTS

| EP | 919786 | 6/1999 |
| EP | 1167921 | 1/2002 |
| EP | 1225671 | 7/2002 |
| EP | 1340960 | 9/2003 |
| EP | 2056065 | 5/2009 |
| GB | 1529608 | 10/1978 |
| GB | 2364950 | 2/2002 |
| GB | 2436432 | 9/2007 |
| JP | H11173843 | 7/1999 |
| JP | H11183170 | 7/1999 |
| WO | 2008144545 | 11/2008 |

\* cited by examiner

LEVEL INCLUDING REMOVABLE END CAPS

CROSS-REFERENCE TO RELATED APPLICATIONS

This application claims priority to co-pending U.S. Provisional Patent Application No. 62/079,054 filed on Nov. 13, 2014, co-pending U.S. Provisional Patent Application No. 62/159,025 filed on May 8, 2015, co-pending U.S. Provisional Application No. 62/180,287 filed on Jun. 16, 2015, and co-pending U.S. Provisional Patent Application No. 62/180,461 filed on Jun. 16, 2015, the entire contents of all of which are incorporated herein by reference.

FIELD OF THE INVENTION

The present invention relates to levels and more particularly to levels including magnets, illuminated vials, and end cap assemblies.

SUMMARY OF THE INVENTION

The present invention provides, in one aspect, a level having a frame supporting a plurality of level vials and including an aperture disposed on an end of the level, and an end cap assembly detachably coupled the end of the frame. The end cap assembly includes an end cap and a retainer. A portion of the end cap is received in the aperture and is maintained in engagement by the retainer.

The present invention provides, in another aspect, a method for attaching an end cap assembly to a level. The end cap assembly includes an end cap and a retainer. The method includes attaching the end cap to an end of the level such that a movable tab of the end cap is received in an aperture of the level, and inserting the retainer clip into an opening in the end cap, causing a movable leg of the retainer to maintain secure engagement of the movable tab with a frame of the level.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figures 1, 4, 5, 6:
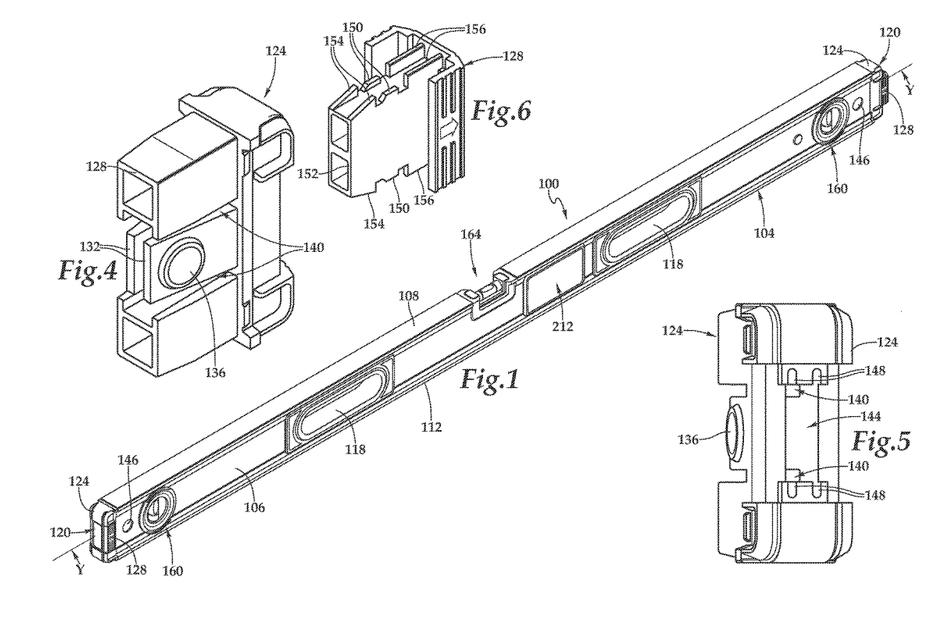
FIG. 1 is a side view of a level including an end cap assembly.
FIG. 4 is a perspective view of an end cap of the end cap assembly.
FIG. 5 is another perspective view of the end cap of FIG. 4.
FIG. 6 is a perspective view of retainer of the end cap assembly.
Figures 2, 12, 13:
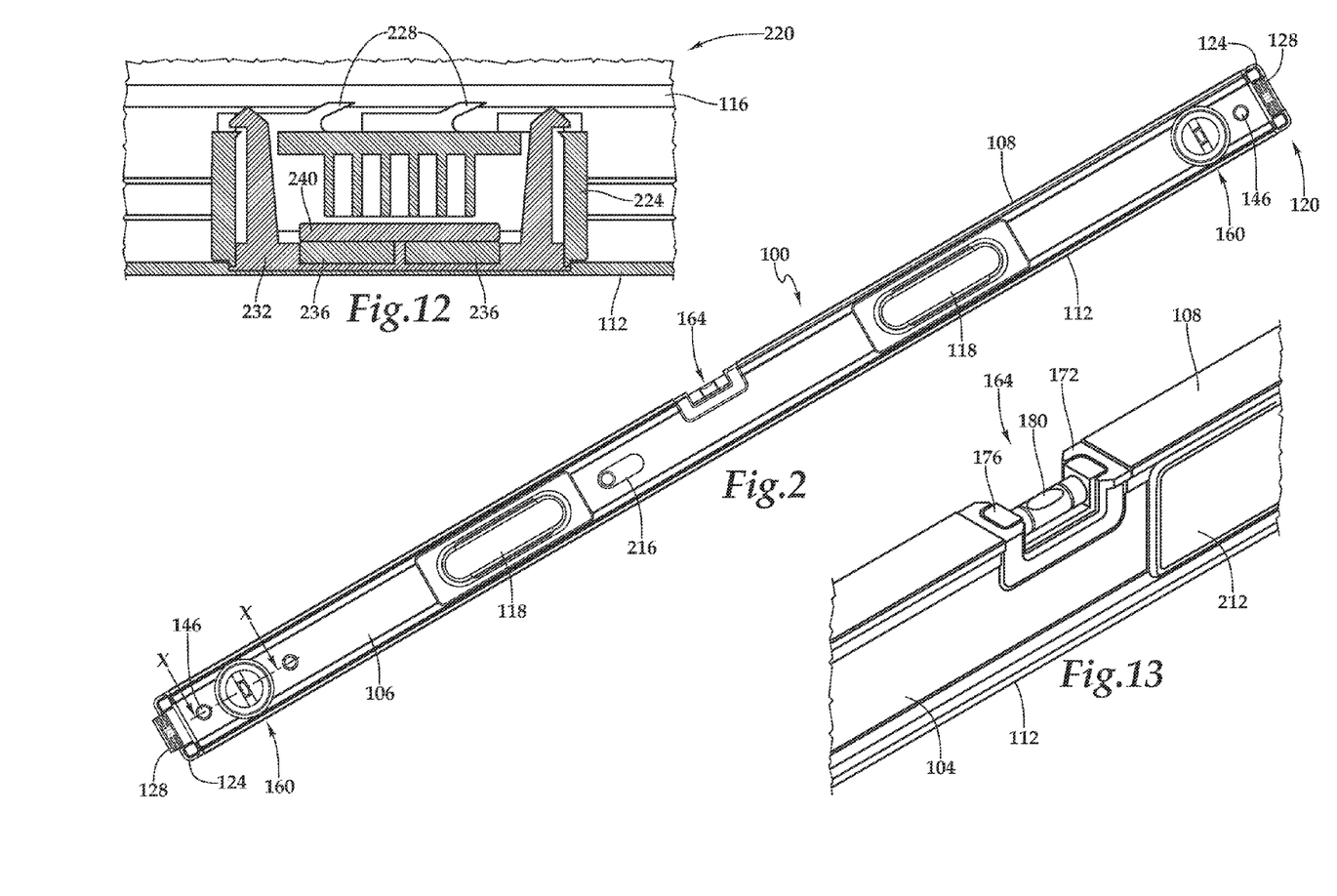
FIG. 2 is a left-side perspective view of the level of FIG. 1.
FIG. 12 is a cross-sectional view a magnet assembly of the level of FIG. 1.
FIG. 13 is a perspective view of the horizontal vial assembly of FIG. 9.
Figures 3, 7, 8:
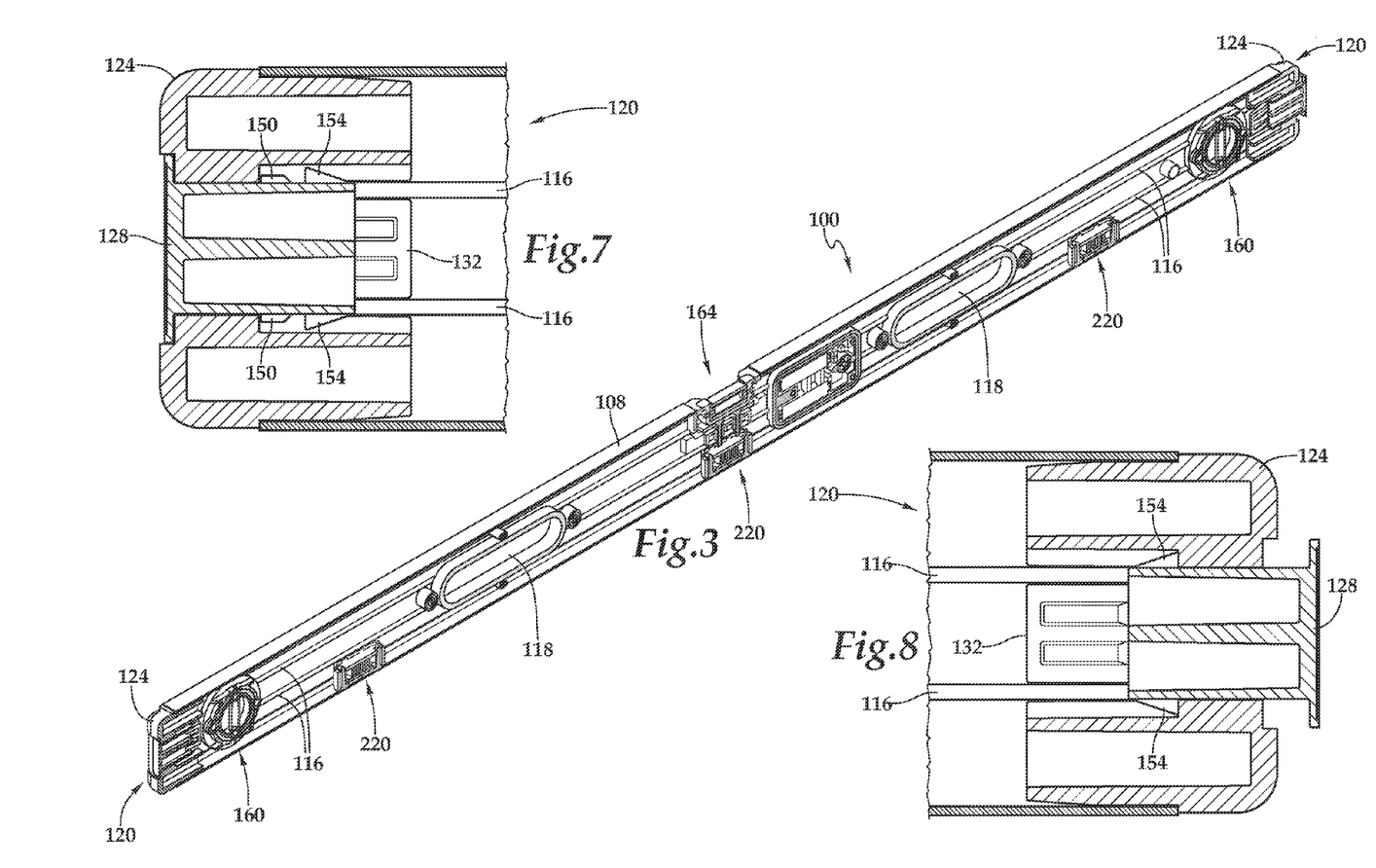
FIG. 3 is a cross sectional view taken along section line Y-Y of the level of FIG. 1.
FIG. 7 is a cross-sectional view taken along section line Y-Y of a portion of the level of FIG. 1, showing the end cap assembly in a locked position.
FIG. 8 is a cross sectional view taken along section line Y-Y of a portion of the level of FIG. 1, showing the end cap assembly in an unlocked position.

Referring to FIGS. 1 and 2, a level 100 includes an elongated body 104 having a first planar surface 108 and a second planar surface 112 that are each substantially flat and parallel to one another. The elongated body 104 also defines side surfaces 106 that extend between the planar surfaces 108, 112 and are generally perpendicular to the planar surfaces 108, 112. As is well known, the planar surfaces 108, 112 are positioned on objects in order to check the orientation or level of that object. With reference to FIG. 3, the elongated body 104 of the illustrated level 100 is substantially hollow to reduce the weight of the level while also providing interior space for positioning components. Ribs 116 are located within the hollow portion of the level 100 and extend parallel to each other along the entire length, or a portion of the length, of the elongated body 104. In particular, two upper ribs 116 are positioned closer to the first planar surface 108 relative to two lower ribs 116 that are positioned closer to the second planar surface 112. Furthermore, handles 118 extend through the side surfaces of the elongated body 104 and are operable to grip the level 100.

A removable end cap assembly 120 is selectively positioned at each end opening of the level 100 to cover the end of the elongated body 104. The end cap assembly 120 includes a first portion or end cap 124 (FIGS. 4 and 5) and a second portion or retainer 128 (FIG. 6). The end cap 124 is more resilient and softer than the retainer 128 and fits within the opening of the elongated body 104. The end cap 124 includes movable tabs 132, each having a button 136. In the illustrated embodiment, the button 136 is cylindrical; however, in other embodiments, the button may be non-cylindrical. The end cap 124 also includes slits 140 adjacent the movable tabs 132. The tabs 132 are movable in that the tabs 132 can pivot, bend, or deflect relative to each other and the remainder of the end cap 124. With reference to FIG. 5, a channel 144 extends through the end cap 124. Slots 148 are positioned adjacent the channel 144 and extend towards the movable tabs 132. In the illustrated embodiment, two slots 148 are positioned oppositely from two slots 148; however, in other embodiments, one slot may be positioned oppositely from another slot.

The retainer 128 is formed from a harder or more rigid material (e.g., hard plastic, metal, etc.) than the end cap 124 and is sized to fit within the end cap 124. In particular, the retainer 128 includes a body 152 that is sized to be received within the channel 144. The body 152 includes four protrusions 156 (three of which are shown in FIG. 6) that are sized to be received within the slots 148. The illustrated body 152 also includes detents 150 and stops 154, with the detents 150 located between the stops 154 and the protrusions 156.

Upon assembly of the end cap 124 and the retainer 128 to the elongated body 104 (FIG. 7), the end cap 124 is positioned within the end opening of the elongated body 104 such that the ribs 116 are received within the slits 140. As such, the engagement between the ribs 116 and the slits 140 provides support and alignment as the end cap 124 is coupled to the elongated body 104. As the retainer 128 is inserted into the channel 144, the body 152 engages and moves the movable tabs 132 such that the buttons 136 engage an aperture 146 in the elongated body 104. In addition, the detents 150 abut an interior wall of the end cap 124, providing positive feedback once the retainer 128 fully engages the end cap 124. Therefore, the end cap assembly 120 is locked in position.

To remove the end cap assembly 120 (FIG. 8), the retainer 128 is moved out of the channel 144 and away from the elongated body 104 so that the detents 150 disengage from the interior wall of the end cap 124. The retainer 128 is further moved away from the elongated body 104 until the stops 154 abut the interior wall of the end cap 124. As such, the body 152 slides along the movable tabs 132, allowing the buttons 136 to disengage from the apertures 146 of the elongated body 104.

With reference to FIGS. 1-3, the illustrated level 100 includes two vertical vial assemblies 160 (e.g., plumb vials) and a horizontal vial assembly 164 (e.g., level vial). In particular, the horizontal vial assembly 164 is orientated parallel to the planar surfaces 108, 112, whereas the vertical vial assemblies 160 are orientated perpendicular to the planar surfaces 108, 112. Both the vertical and horizontal vial assemblies 160, 164 are coupled to the elongated body 104 utilizing the ribs 116, as described in detail below.

Figure 9:
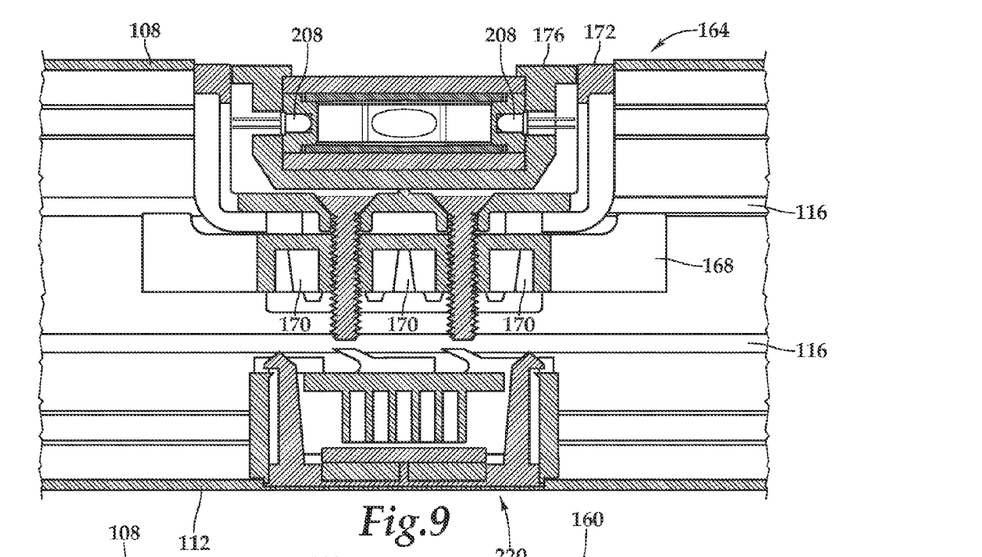
FIG. 9 is a cross-sectional view of a horizontal vial assembly of the level of FIG. 1.

With reference to FIGS. 9 and 13, the horizontal vial assembly 164 includes an anchor 168 configured to abut the upper ribs 116. The anchor 168 includes apertures 170 that are utilized for alignment of the anchor 168 within the elongated body 104. For example, a tool includes protrusions that engage the apertures 170 such that the tool can move the anchor 168 into position from outside the elongated body 104. A first housing member 172 includes grooves that are sized to engage the upper ribs 116. The anchor 168 and the first housing member 172 are secured together by fasteners (e.g., screws), thereby providing locking engagement with the elongated body 104. A second housing member 176 is coupled to a level vial 180, and the second housing member 176 is secured to the first housing member 172 via an adhesive (e.g., epoxy) that is injected therebetween. To aid in alignment, the first housing member includes a central protrusion between the fasteners. The second housing member engages this central protrusion, which acts as a fulcrum to allow the fine alignment of the vial prior to the addition of the adhesive.

Figure 10:
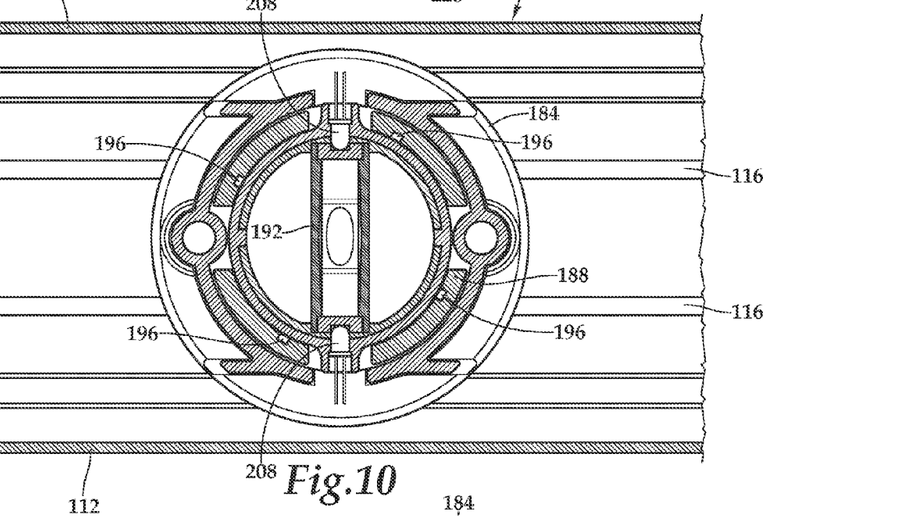
FIG. 10 is a cross-sectional view taken along section line Y-Y of a vertical vial assembly of the level of FIG. 1.
Figure 11:
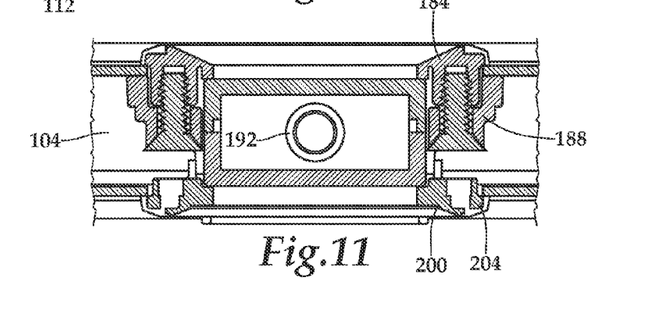
FIG. 11 is a cross-sectional view taken along section line X-X of FIG. 2 of the vertical vial assembly of FIG. 10.

With reference to FIGS. 10 and 11, the vertical vial assembly 160 includes a first cover 184 that engages a side surface of the elongated body 104 and extends into the hollow portion of the elongated body 104. The illustrated first cover 184 includes grooves that engage the ribs 116 to inhibit rotation of the first cover 184 relative to the elongated body 104. The first cover 184 is clamped onto the elongated body 104 by a support member 188 secured to the first cover 184 by fasteners (e.g., screws). A level vial assembly 192 is received within the support member 188 abutting the first cover 184. Alignment ribs 196 maintain axial alignment between the cover 184 and the level vial 192. A second cover 200 engages the first cover 184 and includes a ring member 204 that engages the other side surface of the elongated body 104. The second cover 200 and the ring member 204 are attached to the first cover 184 by either an adhesive or an ultra-sonic welding process.

Furthermore, the level vials 180, 192 are coupled to LEDs 208 (FIGS. 9 and 10) that illuminate some or all of the vial assemblies 160, 164 to improve the readability of the level 100. The LEDs 208 are operable by a power source (e.g., at least one battery) that is received within a battery housing 212 (FIGS. 1 and 3). A power button 216 (illustrated in FIG. 2) is positioned opposite the battery housing 212 and is operable to selectively provide power between the power source and the LEDs 208. In other embodiments, the LEDs 208, the battery housing 212, and the power button 216 may be omitted. In one construction, LEDs are positioned adjacent each end of the vial and are bonded in place using an adhesive.

With reference to FIGS. 3 and 12, magnet assemblies 220 are located within the hollow portion of the elongated body 104 and are adjacent the planar surface 112 opposite from the horizontal vial assembly 164. In the illustrated embodiment, three magnet assemblies 220 are positioned within the elongated body 104; however, in other embodiments, there may be more or less than three magnet assemblies 220. In other embodiments, the magnet assemblies 220 may be located adjacent the planar surface 108. The magnet assemblies 220 are operable to couple the level 100 to a metallic surface such that the level 100 is maintained in position without operator's input.

As shown in FIG. 12, each magnet assembly 220 includes a first housing 224 having resilient fingers 228 operable to engage the lower ribs 116. As such, the magnet assemblies 220 are biased towards the planar surface 112. A second housing 232 includes tabs that engage with the first housing 224 internally within the elongated body 104. The illustrated second housing 232 also extends through an aperture within the planar surface 112 so that a portion of the second housing 232 is substantially flush or coextensive with the planar surface 112. The second housing 232 includes cavities that receive magnets 236 therein. Preferably, the magnets 236 are arranged adjacent one another, with one of the magnets 236 having a south pole facing outward from the level 100 and the second magnet having a north pole facing outward from the level 100. This arrangement produces a magnetic field or magnetic circuit between the adjacent north and south poles that produces a greater magnetic attraction that would otherwise be produced by magnets arranged with a common pole facing outward. In the illustrated embodiment, the second housing 232 includes two cavities each receiving a magnet 236; however, in other embodiments, the second housing 232 may support more or less than two magnets. The magnets 236 are secured to the second housing 232 by a strap 240 with an adhesive positioned on the strap 240 to ensure that the strap 240 is fixed to the second housing 232.

FIGS. 14-27 illustrate a level 300 including a frame 304 having end cap assemblies 308 coupled to opposite ends of the frame 304. It should be noted that any features presented herein may be incorporated into the embodiment illustrated in FIGS. 1-13, and any features presented above may be incorporated into the embodiment illustrated in FIGS. 14-27. The end cap assemblies 308 are selectively coupled to the frame 304. The level 300 is utilized to determine whether an object is level to a particular surface or for adjusting an object to a level surface. The level 300 may be used to measure and level at different angles, e.g., 0 degrees and 90 degrees.

Figures 14, 16:
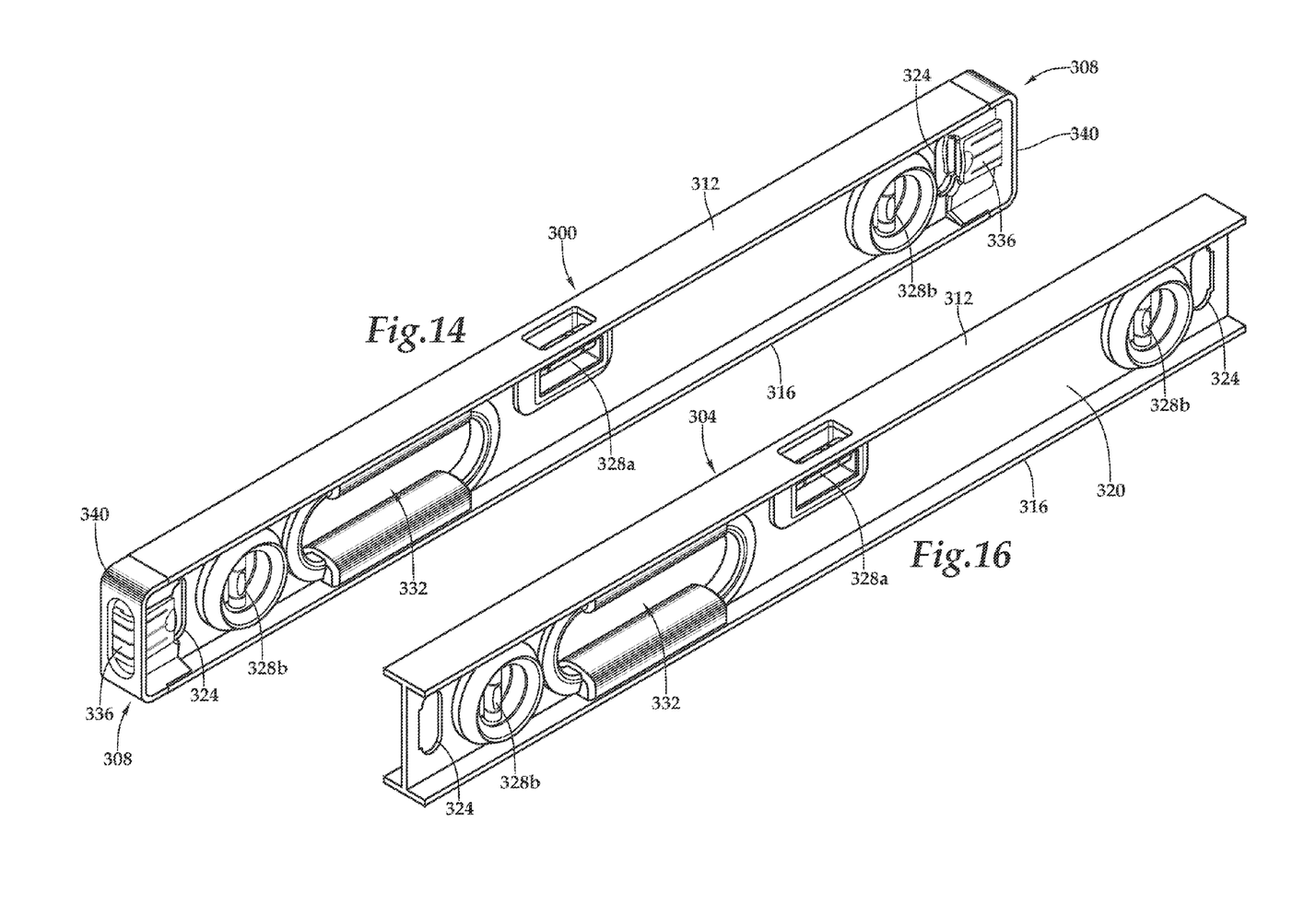
FIG. 14 is a perspective view of another level including end cap assemblies.
FIG. 16 is a perspective view of the level omitting the end cap assemblies shown in FIG. 14.
Figure 15:
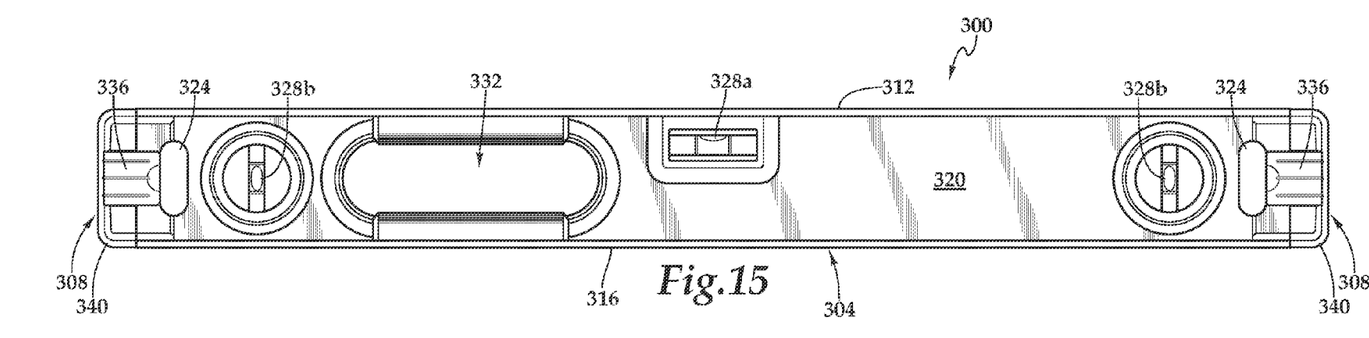
FIG. 15 is a side view of the level of FIG. 14.
Figure 17:
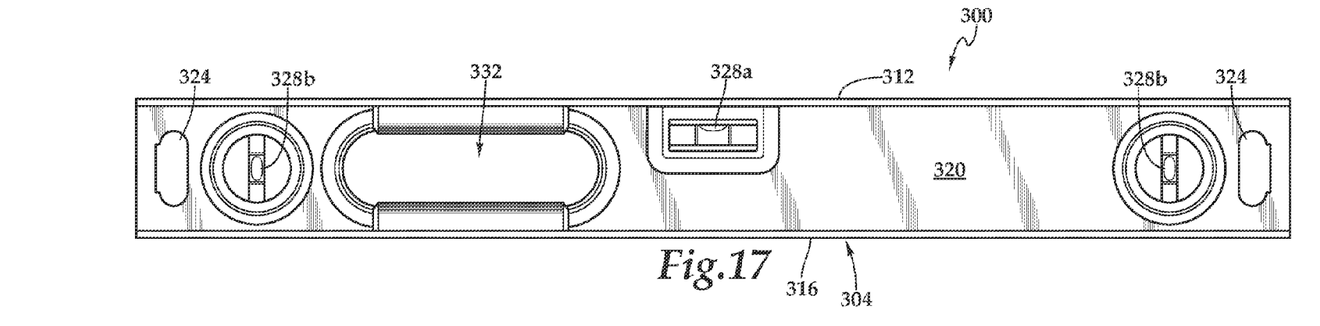
FIG. 17 is a side view of the level shown in FIG. 16.

As best illustrated in FIGS. 16 and 17, the frame 304 includes a top planar surface 312, a bottom planar surface 316, and an intermediate surface 320 that extends between the top planar surface 312 and the bottom planar surface 316. The top planar surface 312 is spaced apart from and substantially parallel to the bottom planar surface 316. In contrast, the intermediate surface 320 extends from and is substantially perpendicular to the top and the bottom surfaces 312, 316. As a result, a cross section of the frame 304 yields an I-beam construction (FIG. 16). In other embodiments, the level 300 may be a box level that includes a hollow rectangular cross section.

The intermediate surface 320 includes hanging apertures 324, leveling vials 328, and a handle 332. The handle 332 is defined as an opening in the intermediate surface 320 in order for an operator to handle and manipulate the level 300. The hanging apertures 324 are located at opposite ends of the frame 304 and are generally oblong-shaped slots extending towards the top planar surface 312 and the bottom planar surface 316. In other embodiments, the hanging apertures 324 may be differently shaped (e.g., circular, triangular, polygonal, etc.). The hanging apertures 324 allow the level 300 to be coupled to a support structure (e.g., nail, merchandiser bracket, etc.).

In the illustrated embodiment, the leveling vials 328 include a 0-degree vial 328A and two 90-degree vials 328B. The 90-degree vials 328B are located adjacent ends of the level 300, and the 0-degree vial 328A is located between the 90-degree vials 328B. The long axis of the 0-degree vial is parallel with the top planar surface 312 and the bottom planar surface 316. The long axis of the 90-degree vial is perpendicular with the top planar surface 312 and the bottom planar surface 316. Each vial contains a liquid, a gas bubble, and a series of markings. In other embodiments, the frame 304 may also or alternatively support a 45-degree vial and a 30-degree vial that are orientated at their respective angle relative to the top planar surface 312 and the bottom planar surface 316.

In operation, as the angle of the level 300 (and therefore the angle of the leveling vials 328) changes relative to a fixed axis, the gas bubble moves within the vial 328 along the long axis of the vial 328. The position of the gas bubble with respect to the markings allows the user to determine the orientation of the surface or object to be leveled relative to that vial 328. For example, when the top planar surface 312 engages the surface or object to be leveled, the surface or object to be leveled is level when the gas bubble is centered along the long axis of the 0-degree vial 328A.

Each end cap assembly 308 includes a retainer 336 selectively coupled to an end cap 340. The end cap 340 protects the ends of the frame 304 from damage during use of the level 300.

Figure 18:
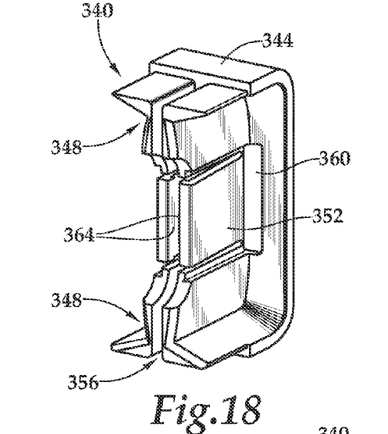
FIG. 18 is a perspective view of an end cap of the end cap assembly of FIG. 14.
Figure 19:
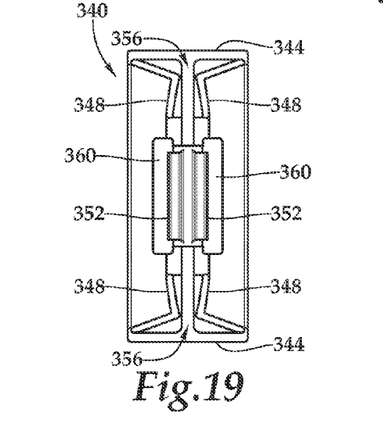
FIG. 19 is a front view of the end cap shown in FIG. 18.
Figure 20:
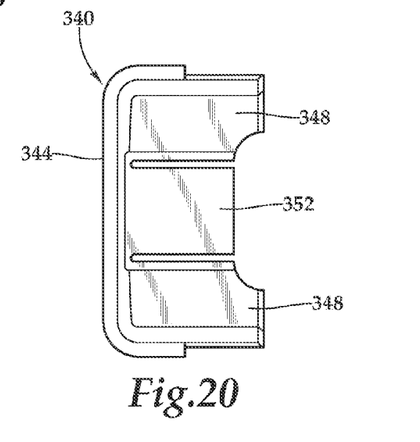
FIG. 20 is a side view of the end cap shown in FIG. 18.
Figure 21:
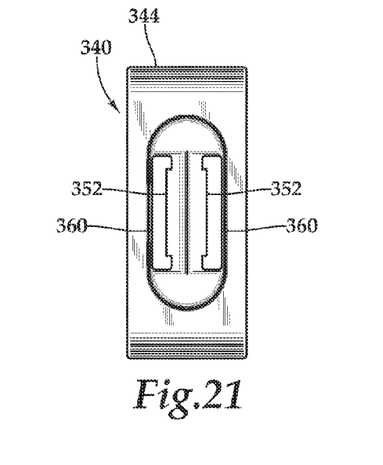
FIG. 21 is a rear view of the end cap shown in FIG. 18.
Figure 22:
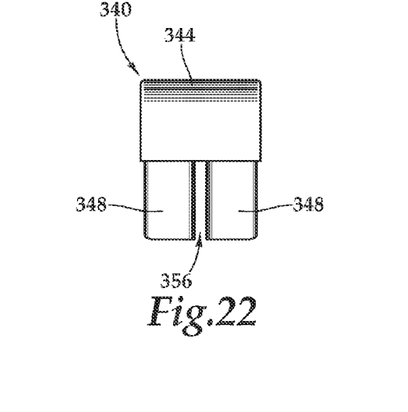
FIG. 22 is a top view of the end cap shown in FIG. 18.
Figure 23:
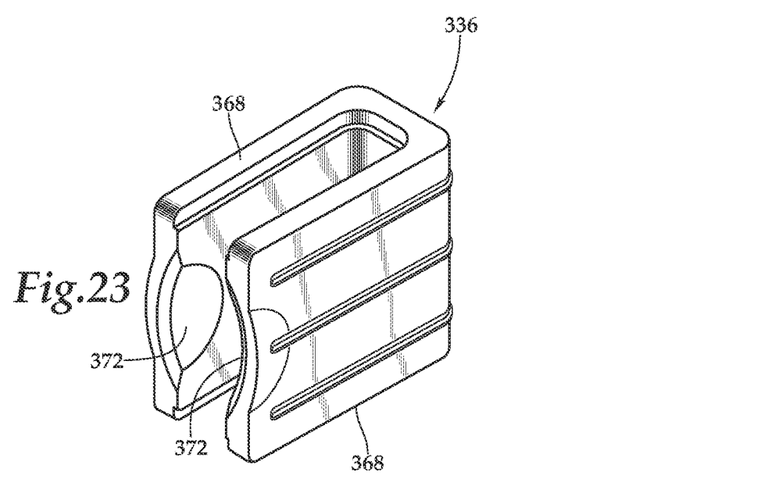
FIG. 23 is a perspective view of a retainer of the end cap assembly of FIG. 14.
Figure 24:
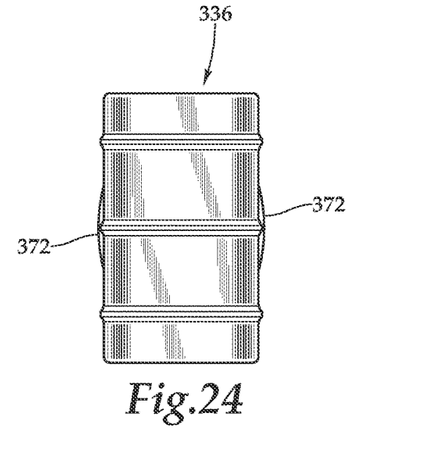
FIG. 24 is a front view of the retainer shown in FIG. 23.
Figure 25:
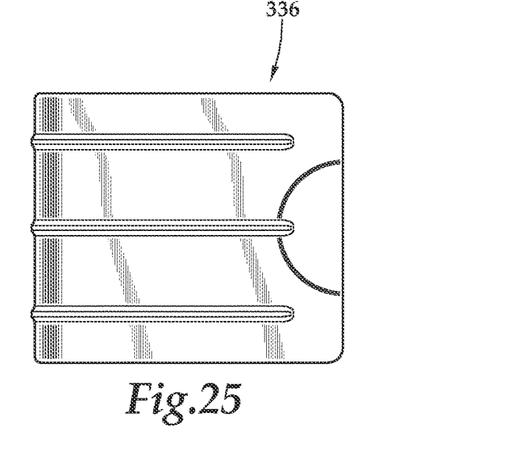
FIG. 25 is a side view of the retainer shown in FIG. 23.
Figure 26:
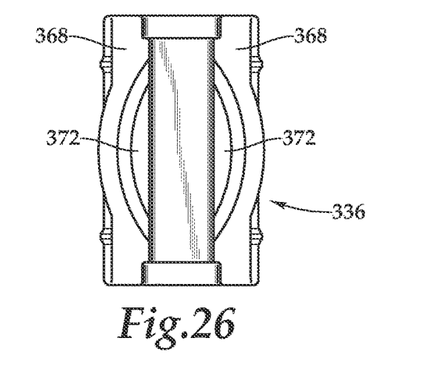
FIG. 26 is a rear view of the retainer shown in FIG. 23.
Figure 27:
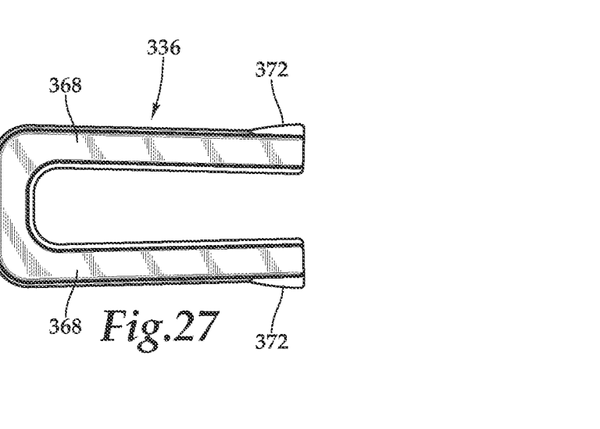
FIG. 27 is a top view of the retainer shown in FIG. 23.

In reference to FIGS. 18-22, the end cap 340 includes an exterior portion 344, an interior portion 348, and movable tabs 352. When the end cap 340 is coupled to the frame 304, the exterior portion 344 extends outside and away from the frame 304, and the interior portion 348 extends into the frame 304. Engagement between the interior portion 348 and the frame 304 facilitates proper alignment between the exterior portion 344 and the top and bottom planar surfaces 312, 316. In the illustrated embodiment, the interior portion 348 includes four segments separated by a channel 356 and the movable tabs 352. The channel 356 is sized to receive the intermediate surface 320 of the frame 304 and extends the entire length of the interior portion 348. In the illustrated embodiment, the four segments of the interior portion 348 are substantially an "L" shaped construction to conform to the I-beam construction of the frame 304. In other embodiments, the interior portion 348 can be differently constructed to conform to different constructions of the frame 304. With reference to FIG. 19, the exterior portion 344 extends beyond a periphery of the interior portion 348.

The exterior portion 344 defines an opening 360 generally aligned with the movable tabs 352. In particular, the movable tabs 352 extend from the opening 360 away from the exterior portion 344. In some constructions, the exterior portion 344 can be manufactured from a shock absorbing material (e.g., plastic, rubber, etc.) to protect the ends of the frame 304.

With reference to FIG. 18, the movable tabs 352 are biased away from each other such that the movable tabs 352 are easily received over the intermediate surface 320. Each movable tab 352 includes a finger 364. The fingers 364 extend towards each other and are sized to fit within a portion of the hanging aperture 324.

With reference to FIGS. 23-27, the retainer 336 includes movable legs 368 and recesses 372. The retainer is generally U-shaped such that the legs 368 extend generally parallel but slightly angled relative to each other. The legs 368 are movable in that the legs 368 can deflect, bend, or pivot relative to each other. The movable legs 368 are biased towards each other and sized to engage the movable tabs 352. The recesses 372 are located near the open portion of the retainer 336 and are in facing relationship to each other. In addition, the retainer 336 may also be referred as a locking member, as discussed in more detail below. Furthermore, the retainer 336 functions as a tool-less (e.g., key-less) locking member.

To attach the end cap assemblies 308 to the frame 304, the end cap 340 is inserted on each end of the frame 304. The intermediate surface 320 is received within the channel 356, and the interior portion 344 extends into the frame 304. In this position, the interior portion 344 extends from the top, the bottom planar surfaces 312, 316 extend around the hanging aperture 126, and the fingers 364 align with a portion of the hanging aperture 324. Because the movable tabs 352 are biased away from each other, the end cap 340 is easily attached to the frame 304.

In order to secure the end cap 340 to the frame 304, the retainer 336 is inserted into the end cap 340. In particular, the retainer 336 is inserted into the end cap 340 via the opening 360. As the retainer 336 is inserted in the opening 360, the movable legs 368 contact the movable tabs 352. The biasing force of the movable legs 368 is greater than the movable tabs 352 such that the movable legs 368 will move the fingers 364 together, thereby clamping the fingers 364 within the hanging aperture 324. Once the fingers 364 engage portions of the frame 304 surrounding the hanging aperture 324, the end cap 340 is secured to the frame 304. In other words, the retainer 336 functions as a locking member to secure the end cap 340 to the frame 304.

To remove the end cap 340 from the frame 304, the operator grabs the retainer 336 via the recesses 372 and moves the retainer 336 away from the hanging aperture 324 and through the opening 360. As a result, the movable tabs 352 bias away from the hanging aperture 324 to be easily removed from the frame 304. The retainer 336 (i.e., the locking member) locks or unlocks the end cap 340 to the frame 304 without the need of a key or tool.

FIGS. 28-36 illustrate another embodiment of an end cap assembly 408 for use with the level 300 presented above. The end cap assemblies 408 may be utilized with the level 300 in place of end cap assemblies 308. The end cap assembly 408 includes a retainer 436 and an end cap 440, which are configured to attached to and engage the level 300 in a similar manner to the end cap assembly 308.

Figures 31, 32:
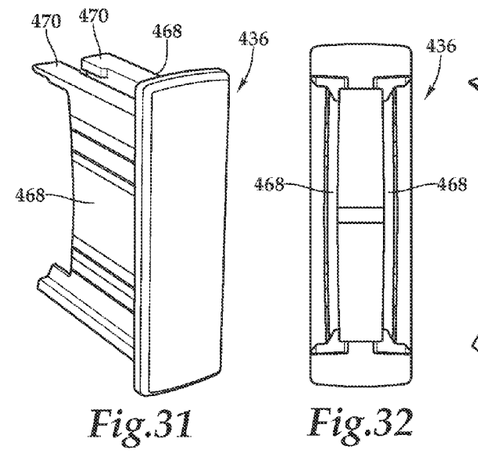
FIG. 31 is a perspective view of the retainer of FIG. 28.
FIG. 32 is a rear view of the retainer shown in FIG. 31.

With reference to FIGS. 31 and 32, the retainer 436 includes a flat surface having movable legs 468 extending away from one side of the surface. The movable legs 468 are biased towards each other and are engageable with the end cap 440. In addition, each movable leg 468 include a pair of flanges 470 extending along opposing sides of the legs 468 to aid in the mating of the retainer 436 and the end cap 440.

Figure 30:
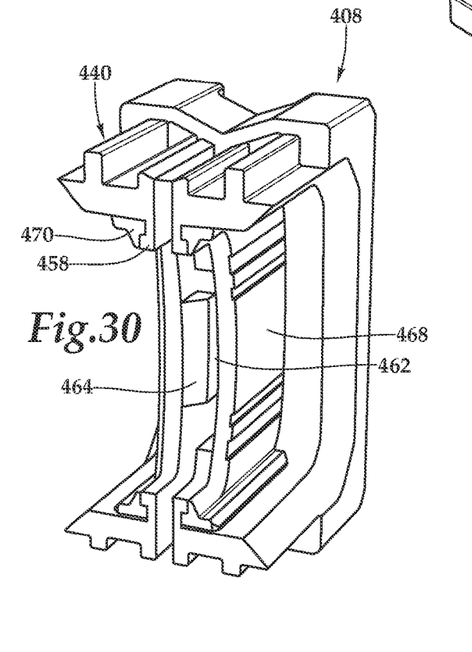
FIG. 30 is a rear perspective view of the end cap assembly of FIG. 29.

With reference to FIGS. 33-36, the end cap 440 includes an exterior portion 444 and an interior portion 448, and a movable tab 452. The exterior portion 444 is constructed from a softer material (e.g., rubber) than the retainer 436. When the end cap 440 is coupled to the frame 304, the exterior portion 444 extends outside and away from the frame 304, and the interior portion 448 extends into the frame 304. Engagement between the interior portion 448 and the frame 304 facilitates proper alignment between the exterior portion 444 and the top and bottom planar surfaces 312, 316. In the illustrated embodiment, the interior portion 448 includes two segments separated by a channel 456, with the movable tab 452 formed on one of the segments. The channel 456 is sized to receive the intermediate surface 320 of the frame 304 (FIG. 16) and extends the entire length of the interior portion 448. In the illustrated embodiment, the two segments of the interior portion 448 are substantially a U-shaped construction to conform to the I-beam construction of the frame 304. Each U-shaped segment includes flanges 458 along each leg of the U-shaped construction. The flanges 458 are configured to mate with the flanges 470 of the clip 436 (FIG. 30).

Figures 34, 35, 36:
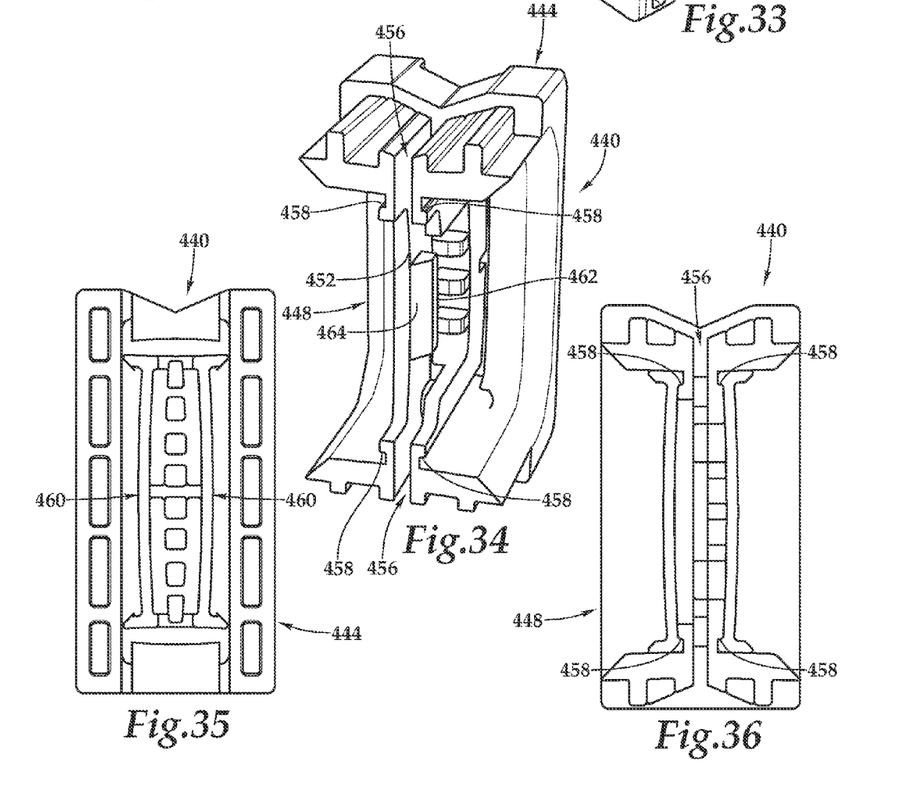
FIG. 34 is a rear perspective view of the end cap shown in FIG. 33.
FIG. 35 is a front view of the end cap shown in FIG. 33.
FIG. 36 is a rear view of the end cap shown in FIG. 33.

With reference to FIGS. 35 and 36, the end cap 440 includes a pair of openings 460 sized and shaped to receive the movable legs 468 of the clip 436. The exterior portion 444 also includes a plurality of recesses disposed on the surfaces surrounding the openings 460.

Figure 33:
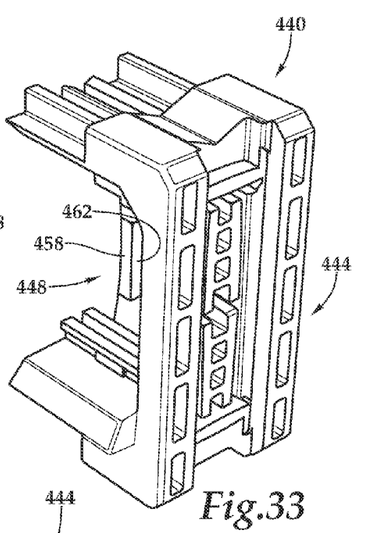
FIG. 33 is a front perspective view of the end cap of FIG. 28.

With reference to FIGS. 33 and 34, the movable tab 452 extends between the openings 460 and includes a finger 464 having a flat surface 462. The finger 464 is sized and shaped to fit within a portion of the hanging apertures 324 such that, when the end cap 440 is place on the frame 304, the flat surface 462 engages portions of the frame 304 surrounding the hanging aperture 324.

To attach the end cap assemblies 408 to the frame 304, the end cap 440 is inserted on each end of the frame 304. The intermediate surface 320 is received within the channel 456, and the interior portion 444 extends into the frame 304 such that the movable tab 452 extends along the intermediate surface 320. In addition, the finger 464 is received within the hanging aperture 324, thereby placing the flat surface 462 into engagement with a portion of the frame 304.

Figure 28:
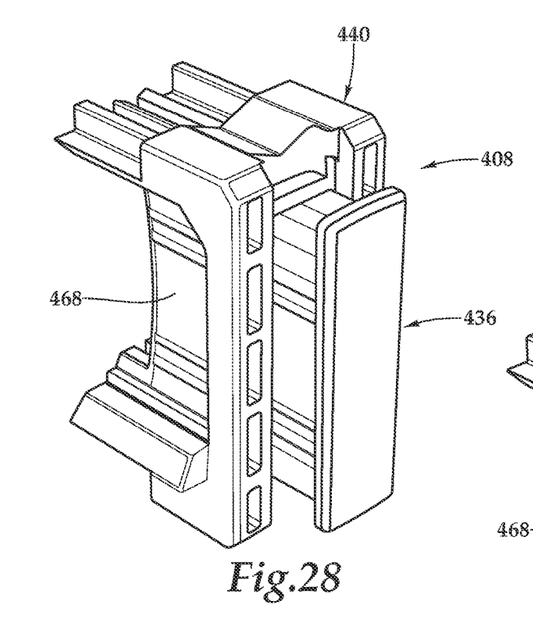
FIG. 28 is a front perspective view of another end cap assembly for use with the level of FIG. 14, the end cap assembly including an end cap and a retainer partially removed from the end cap.
Figure 29:
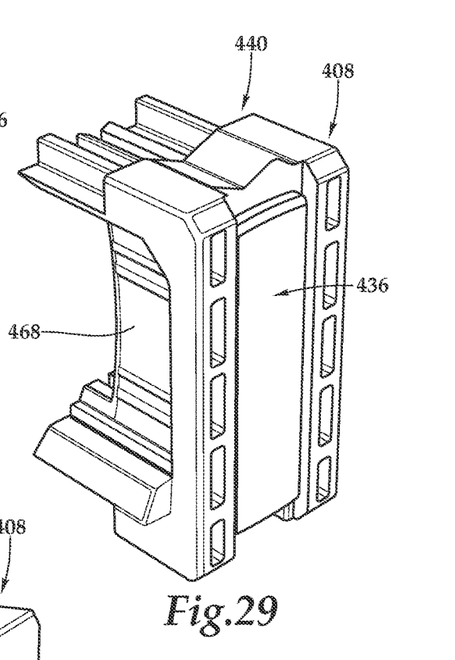
FIG. 29 is a front perspective view of the end cap assembly with the retainer completely inserted into the end cap.

In order to secure the end cap 440 to the frame, the retainer 436 is interested into the end cap 440 (FIG. 28-30). More specifically, the movable legs 468 are inserted through the openings 460 such that the movable legs 468 extend into the interior portion 448. One of the movable legs 468 engages the movable tab 452 in order to bias the finger 464 of the tab 452 into the aperture 324. Since the movable legs 468 have a greater biasing force than the movable tab 452, the tab 452 is securely engaged with the frame 304. In other words, the retainer 436 functions as a locking member to secure the end cap 440 to the frame 304.

To remove the end cap 440 from the frame 304, the operator pulls the retainer 436 out of the openings 460, without the need for any key or tool. This results in the movable legs 468 moving out of engagement with the movable tab 452, thereby removing the biasing force maintaining a secure engagement of the finger 464 within the aperture 324. At this time, the user may easily remove the finger 464 from the aperture 324 and detach the end cap 440 from the frame 304.

Various features of the invention are set forth in the following claims.

What is claimed is:

1. A level comprising:
a frame supporting a plurality of level vials and including an aperture disposed on an end of the level;
an end cap assembly detachably coupled to the end of the frame, the end cap assembly including an end cap and a retainer;
wherein a portion of the end cap is received in the aperture and is maintained in engagement with the frame by the retainer;
wherein the frame includes a generally hollow cross section having an upper planar surface, a lower planar surface, and two sidewalls extending therebetween, wherein a passageway is bounded by interior surfaces of the upper planar surface, the lower planar surface, and the two sidewalls;

wherein the end cap is received within the passageway.

2. The level of claim 1, wherein the end cap further includes a movable tab that engages the frame.

3. The level of claim 2, wherein the movable tab is biased into engagement with the frame by a movable leg of the retainer.

4. The level of claim 1, wherein the end cap includes an opening that receives the retainer.

5. The level of claim 1, wherein the retainer is constructed from a material that is less flexible than the end cap.

6. The level of claim 1, wherein each level vial defines a longitudinal axis, and wherein the longitudinal axis of one of the plurality of level vials is angled relative to the longitudinal axis of another of the plurality of level vials.

7. The level of claim 1, wherein the generally hollow cross section of the frame is a rectangular cross section.

8. The level of claim 1, wherein the aperture is formed one of the sidewalls.

9. The level of claim 1, wherein the end cap includes a movable tab that is received within the aperture.

10. The level of claim 1, wherein the retainer biases the movable tab into the aperture to prevent removal of the end cap from the passageway.

11. A method for attaching an end cap assembly to a level, the end cap assembly including an end cap and a retainer, the method comprising:

attaching the end cap to an end of the level such that a movable tab of the end cap is received in an aperture of the level; and inserting the retainer clip into an opening in the end cap, causing a movable leg of the retainer to maintain secure engagement of the movable tab with a frame of the level.

12. The method of claim 11, wherein attaching the end cap further includes aligning a channel of the end cap with a section of the frame such that the section of the frame is received within the channel.

13. The method of claim 11, wherein the movable tab includes a finger that engages the frame of the level.

14. The method of claim 11, wherein inserting the retainer clip further includes aligning a flange of the movable leg with a flange of the movable tab.

15. A level comprising:

a frame comprising:
    an upper planar surface;
    a lower planar surface,
    two sidewalls extending between the upper planar surface and the lower planar surface;
    a passageway bounded by interior surfaces of the upper planar surface, the lower planar surface, and the two sidewalls; and
    an aperture located through at least one of the two sidewalls;

a plurality of level vials supported by the two sidewalls; and an end cap received within the passageway, the end cap including a moveable tab and a channel extending through the end cap; and a retainer received into the channel of the end cap such that retainer biases the moveable tab of the end cap into the aperture coupling the end cap to the frame.

16. The level of claim 15, wherein a cross-sectional shape of the passageway is generally rectangular.

* * * * *